INVENTOR
Wallace Gordon Chalmers
BY
Cushman, Darby & Cushman
ATTORNEYS

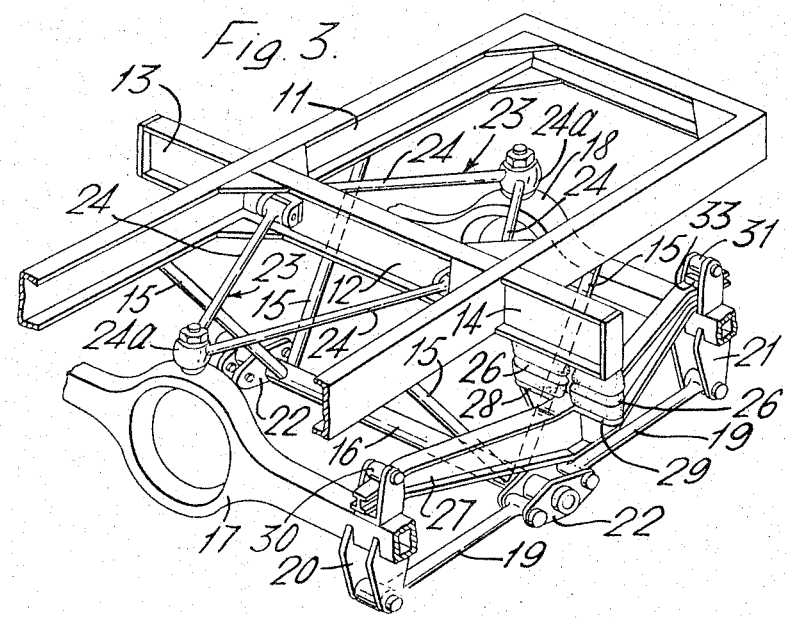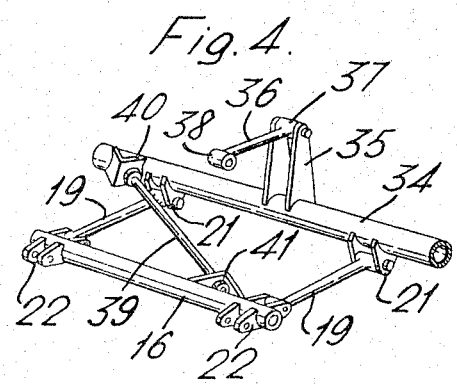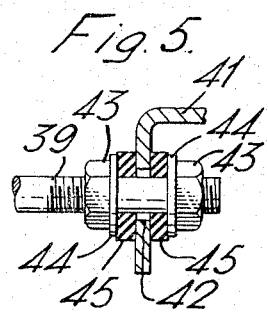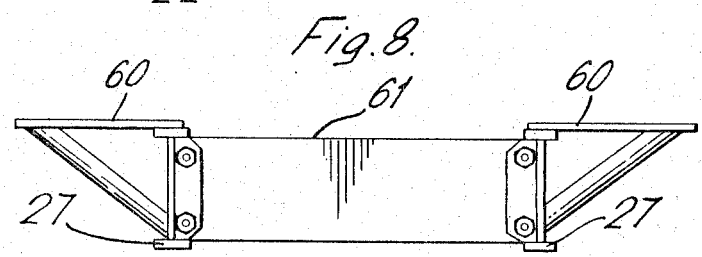

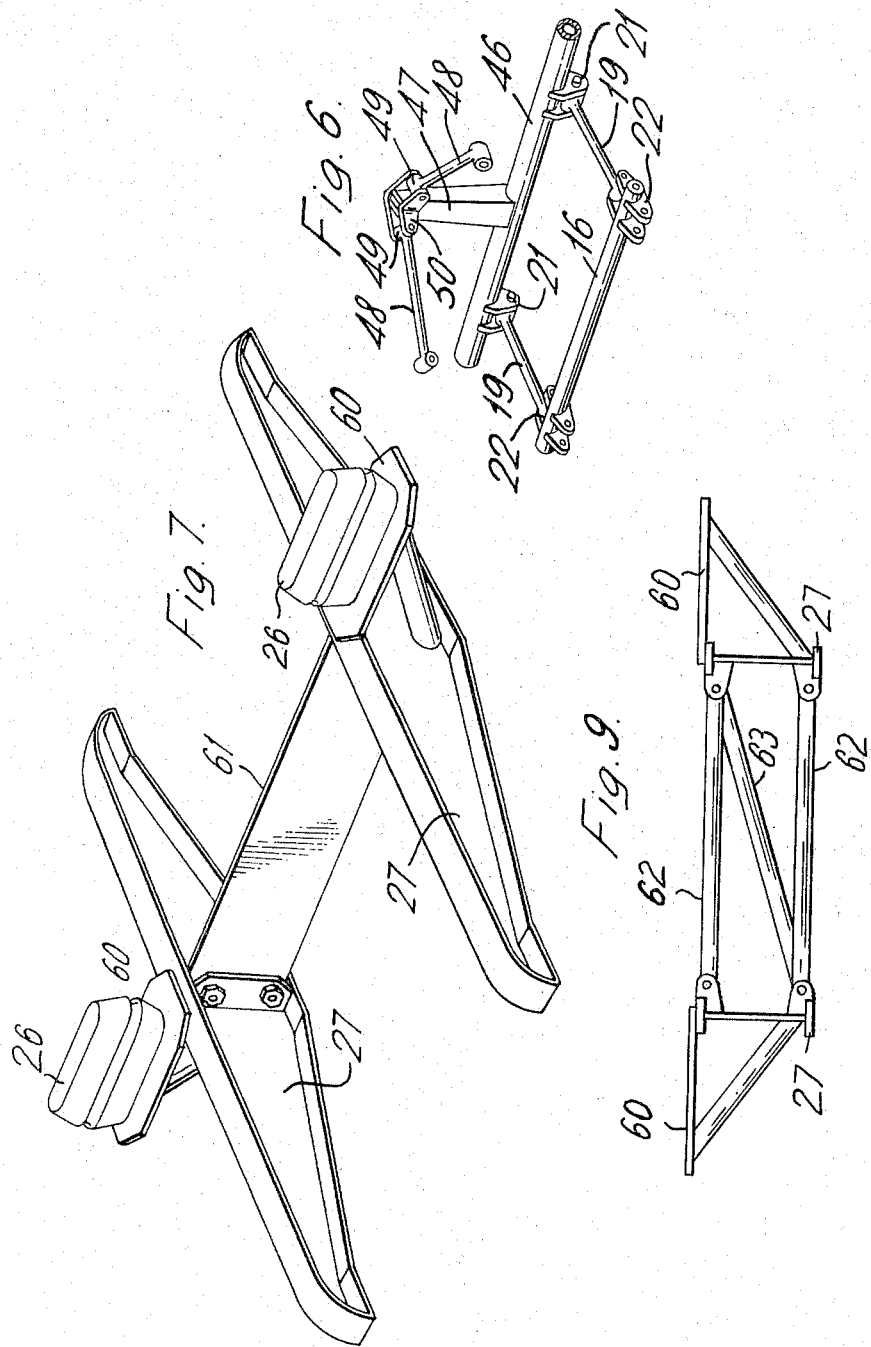

United States Patent Office 3,315,979
Patented Apr. 25, 1967

3,315,979
TANDEM AXLE SUSPENSION
Wallace Gordon Chalmers, 372 Roslyn Ave., Westmount, Montreal 6, Quebec, Canada
Filed July 12, 1965, Ser. No. 471,127
6 Claims. (Cl. 280—104.5)

This is a continuation-in-part of application Serial No. 383,060, filed on July 16, 1964, now abandoned.

This invention relates to an improved suspension system for road vehicles and, more particularly, to an improved tandem axle suspension for heavy duty trucks, trailers, and semi-trailers having tandem rear axles.

In one well-known tandem axle suspension system an equalizing beam, or walking beam, is positioned at each side of a chassis and longitudinally aligned there with, opposing ends of each walking beam being supported by the two rear axles. Spring means are provided at each side of the chassis and the walking beams are attached, at their mid positions, to the spring means by trunnion bearings. Thus the chassis is supported on the ends of each axle by common walking beams, trunnion bearings, and spring means.

The walking beams are located by the springs and both the beams and springs are called upon to resist transverse cornering wheel loads and torque reaction resulting from traction or braking, in addition to the normal vertical chassis loads. These loads are all transferred from the axles to the chassis through the trunnion bearings and the springs.

In normal use the life of the trunnion bearings and springs are limited because of these adverse load conditions. The expense in parts, labour and down time of the vehicle is a serious disadvantage in use of known suspensions of this type.

In addition the springs must be made stiff in order to maintain acceptable axle alignment. This requirement results in a relatively limited design spring deflection which is detrimental to the riding qualities.

In another well-known tandem axle suspension system a leaf spring assembly is positioned at each side of a chassis and longitudinally aligned therewith, opposing ends of each leaf spring assembly being supported by the two rear axles. The leaf spring assemblies are attached, at their mid positions, to the chassis by trunnion bearings. Thus the chassis is supported on the ends of each axle by common leaf spring assemblies and trunnion bearings.

This system suffers from the same disadvantage as those mentioned above for the well-known walking beam arrangement and has the additional disadvantage that the axles are entirely located, or held in position, by the leaf spring assemblies and thus, when a spring breaks the suspension system partially collapses and one or both axles go out of alignment, rendering the vehicle dangerous to drive. With the springs being responsible for locating the axles on these other suspensions they are accordingly made stiff and the corresponding frequency is so high that a rough ride ensues, resulting in needless wear and tear on the vehicle, as well as damage to freight and driver fatigue.

Thus, to provide an effective suspension, together with acceptable over-all riding characteristics, a tandem axle suspension is called upon to fulfill many requirements, some of which are as follows:

(a) Due to the wide range of load variation experienced in suspension systems of this type, suspension springs should have a correspondingly variable rate of stiffness. That is, the springs should be sensitive enough to respond to bumps when the vehicle is empty or carrying only a light load, and yet the suspension should stiffen up under increased load to provide adequate capacity.

(b) The suspension should provide free articulation to permit the four wheels to independently follow irregular road surfaces.

(c) The axles should be held or located by links or rods, so that not only will they be guided up and down in their correct geometric paths, but also so that reactions from transverse cornering loads, and longitudinal loads, due to the application of brakes or driving torques, will be resisted and transferred directly to the chassis. This latter requirement should be achieved with substantially no weight transfer from one axle to the other. The distribution of load should ideally remain substantially equal.

(d) The weight of the suspension should be kept to a minimum, so that the vehicle will be legally permitted to carry its maximum pay load.

(e) The suspension springs should not be completely relied upon to locate the axles, but should be used merely to cushion the shocks and to support the load.

(f) The springs should be simple and inexpensive and should be easy to replace without special heavy equipment and specially trained personnel.

(g) Parts should be light for ease of storage, transfer and installation.

These requirements are substantially fulfilled in accordance with the present invention, by providing a suspension system in which walking beams are positioned at each side of the chassis and longitudinally aligned therewith, and opposing ends of each walking beam are supported by the two rear axles. Torque rods, extending from the axles to the chassis, completely locate the axles both longitudinally and transversely. Spring means are attached to each side of the chassis and are located directly on the mid positions of each walking beam, permitting the walking beam to rock, or tilt, with the spring means and follow the vertical movements of the wheels. Thus trunnion bearings can be eliminated from the suspension system, and a common source of maintenance trouble, expense and weight, is eliminated.

As the axles are completely located by the torque rods, the walking beams are only required to resist vertical loads and can thus be designed accordingly.

A feature of this invention is that the system can be so designed that each part is called upon to perform one function only, and can therefore be suitably designed to fulfill this singular requirement particularly well. This can result in a suspension system of lighter weight than the over-all weights of well-known suspension systems.

This system is not dependent upon the suspension spring means for complete support and, if the spring should collapse or otherwise degenerate, the chassis will rest on the damaged spring or directly on the walking beams and will be in condition to be driven to any desired location.

Alternative executions of this invention may incorporate variations in the torque rod arrangements for transverse and longitudinal location of the axles, when space problems, or other difficulties, make the use of the preferred execution inconvenient.

It is, therefore, an object of the present invention to provide an improved tandem axle suspension, in which the ends of equalizing, or walking, beams are supported on the rear axles, and in which the walking beams are free to rock on the suspension spring means, thus eliminating troublesome centre trunnion bearings.

Another object is to provide an improved tandem axle suspension system in which all longitudinal and transverse axle loads are resisted by torque rods.

Another object is to provide an improved tandem axle suspension system in which the walking beams are only required to resist vertical loads.

Another object is to provide an improved tandem axle suspension in which all components are designed to perform singular functions, thus providing an over-all lighter and more effective suspension system.

A further object of the present invention is to provide an improved tandem axle suspension system which embodies over-all improved riding characteristics, thus reducing wear and tear on the vehicle, damage to freight, and driver fatigue.

These and other objects and advantages of this invention will be further apparent by reference to the following detailed specification and drawings in which:

FIG. 3 is a perspective view of the road vehicle chassis and suspension system shown in FIG. 1;

FIG. 4 is a perspective view of an alternative execution of the torque rod arrangement;

FIG. 5 shows an enlarged detail of the view in FIG. 4;

FIG. 6 is a perspective view of a further alternative execution of the torque rod arrangement;

FIG. 7 is a perspective view of an alternative embodiment incorporating an outboard spring mounting;

FIG. 8 is a front elevation of the embodiment shown in FIG. 7;

FIG. 9 shows an embodiment similar to FIG. 8.

Figure 1:
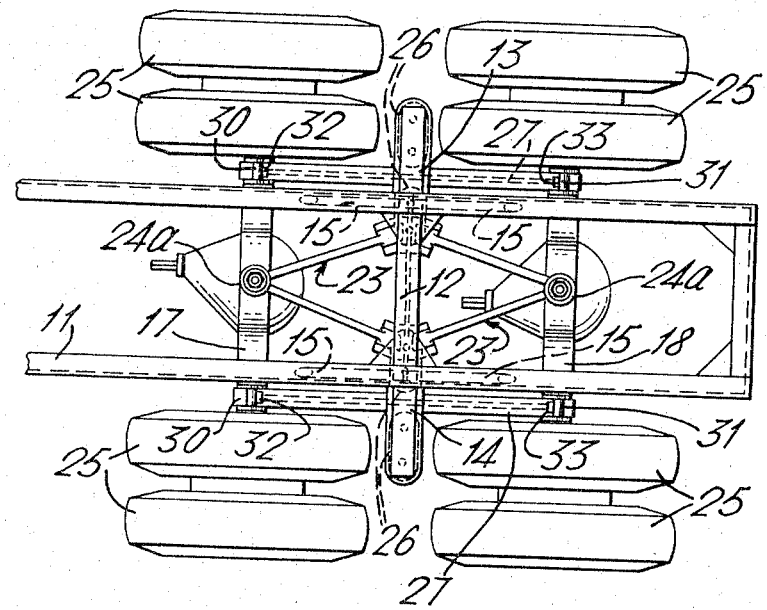
FIG. 1 is a plan elevation of a road vehicle chassis, embodying a dual drive tandem axle suspension system according to the present invention.

Particular reference will now be made to FIGS. 1, 2 and 3, in which substantially rectangular chassis frame 11 includes transversely extending upper cross-member 12 and symmetrical side extensions 13 and 14, extending in line with cross-member 12.

The components of this suspension system are symmetrical about the longitudinal centre line of chassis 11 and about upper cross-member 12, thus in FIG. 3, many symmetrical components are omitted for clarity of illustration.

A triangular shaped space frame extends below, and is rigidly attached to, chassis 11, and comprises side members 15 forming a triangle on each side of chassis 11, and connected and stabilized by lower cross-member 16.

Rear axles 17 and 18 are longitudinally located by lower torque rods 19, which are pivotally connected at their ends to brackets 20 and 21 on axles 17 and 18, respectively, and bracket 22 on lower cross-member 16.

In this specification simple linking rods are referred to as "torque rods" in accordance with the usual terminology of the art.

The rear axles 17 and 18 are longitudinally located, above the horizontal centre line of the axles, by two upper torque rod assemblies 23, each of which comprises two upper torque rods 24, each rigidly connected at one end thereof to form a V-shaped assembly. The apex 24a of one torque rod assembly 23 is pivotally connected to the upper portion of axle 17, on the longitudinal centre line of chassis 11, the other ends of torque rods 24 being pivotally connected to upper cross-member 12. The apex 24a of the other torque rod assembly 23 is pivotally connected to the upper portion of axle 18, on the longitudinal centre line of chassis 11, the other ends of torque rods 24 also being pivotally connected to cross-member 12.

Thus axles 17 and 18 are completely located longitudinally by torque rods 19 and torque rod assemblies 23.

V-shaped torque rod assemblies 23, having their apexes 24a connected to the axles and their open ends connected to upper cross-member 12, also provide complete transverse location for axles 17 and 18.

Figure 2:
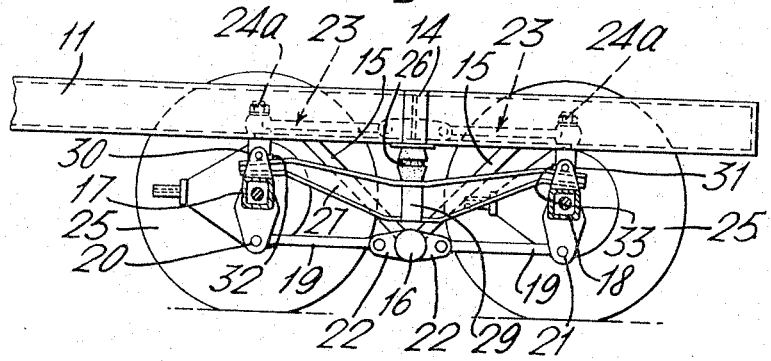
FIG. 2 is a side elevation of the road vehicle chassis and suspension system shown in FIG. 1.

FIG. 2 shows that torque rod assemblies 23 and torque rods 19 are approximately horizontal and in parallel relation when viewed from the side, and thus they effectively absorb and resist the torque from engine power or braking, with little or no resulting vertical reaction or weight transfer.

In the present embodiment the pivotal connections of the torque rod assemblies 23 to axles 17 and 18 and upper cross-member 12, and the pivotal connections of the torque rods 19 to brackets 20, 21 and 22, comprise rubber bushings. However in some cases it will be preferable to employ spherical metal, plastic, or rubber bearings of adequate capacity and having sufficient free movement to allow the suspension components to move freely as each wheel 25 independently follows uneven road contours.

The vehicle load is transferred from chassis side extensions 13 and 14, through compression springs 26, to two walking beams 27 positioned longitudinally on each side of chassis 11.

Walking beams 27, in turn, distribute the load equally to the ends of axles 17 and 18, upon which they rest. In the present embodiment two compression springs 26 are rigidly attached at each side of chassis 11, to side extensions 13 and 14 and are located on beam extensions 28 and 29 at the centre portions of walking beams 27. In this execution, springs 26 are located on beam extensions 28 and 29, but not rigidly attached thereto. It will be understood, however, that this invention is not limited to this arrangement and that other executions could include springs rigidly attached to both the chassis and walking beams.

Compression springs 26 are laterally flexible and thus permit walking beams 27 to tilt or rock therewith to follow the vertical movements of wheels 25. The ends of walking beams 27 are slidably supported on the upper end surfaces of axles 17 and 18 and are restrained in a vertical direction by guides 30 and 31 on axles 17 and 18, respectively, and in a longitudinal outward direction by stops 32 and 33 on the upper end surfaces of walking beams 27. Thus walking beams 27 are located at their ends by axles 17 and 18 and are not attached to chassis 11, so that they are, in effect, "floating" as they move up and down compressing springs 26.

In the execution shown in FIGS. 1 to 3, springs 26 are of the hollow rubber type which provide the required cushioning, have a variable spring rate, and are self-damping to obviate vertical bounce. Hollow rubber springs of adequate capacity are readily available on the market, a suitable type being manufactured by Aeon Products (London) Ltd., England.

Other types of compression springs could be used, such as rubber encased air bellows which are regulated by levelling valves for maintaining the bellows at constant height and near constant frequency, regardless of load, by admitting compressed air thereto or releasing compressed air therefrom. Steel coil springs are another example of compression springs which could equally well be used.

FIGS. 4 and 6 show perspective views of alternative executions of the torque rod arrangements for longitudinal and transverse location of the axles. Consideration such as lack of adequate space, or use of certain axles, may require specialized adaptations of the basic concept.

In FIG. 4, which is symmetrical about lower cross-member 16, axle 18 and torque rod assembly 23 are replaced by axle 34 having bracket 35 extending upwardly therefrom, and a single upper torque rod 36. Upper torque rod 36 is pivotally connected at one end 37 between the ends of bracket 35, and at the other end 38 to upper cross-member 12 (not shown). Diagonal rod 39, which is threaded at each end, extends between bracket 40 on axle 34 and bracket 41 on lower cross-member 16.

FIG. 5 shows a detail of the attachment of one threaded end of diagonal rod 39 to bracket 41, the other threaded end being attached to bracket 40 in a similar manner. In FIG. 5 diagonal rod 39 passes through hole 42 in bracket 41 and is securely clamped thereto by nuts 43, washers 44, and rubber spacers 45.

Thus, in this alternative execution, the axles are completely located longitudinally by torque rods 19 and 36 and transversely by diagonal rods 39.

In FIG. 6, which is also symmetrical about lower cross-member 16, axle 18 and torque rod assembly 23 are replaced by axle 46 having post 47 extending upwardly from the mid portion thereof, and two diagonal torque rods 48. Each diagonal torque rod 48 is pivotally connected at one end 49 to bracket 50 on post 47 and at the other end to upper cross-member 12 (not shown).

Thus, in this further alternative execution, diagonal torque rods 48 provide complete transverse location of axles and, together with torque rods 19, complete longitudinal location of the axles.

In both of the aforementioned alternative embodiments the torque rod connections may comprise rubber bushings or journal type bearing or a spherical metal, plastic or rubber type bearing. These torque rod connections should normally permit some flexibility in movement of the torque rod, although in some embodiments of the present invention it will be sufficient if the torque rod is able to pivot in a single plane.

Insofar as this is possible the unit should be designed so that all torque rods are identical and interchangeable.

FIG. 7 is a perspective view of a further embodiment of the present invention. In this embodiment the springs are mounted outboard with respect to the equalizing beams. Referring to FIGS. 7, 8 and 9, each beam 27 is provided with a spring support platform 60 projecting outwardly from the centre portion of the beam. Platform 60 is adapted to receive springs of the type shown as spring 26 in FIG. 3.

The embodiment of the present invention shown in FIGS. 7 to 9 should lend increased stability in certain applications of the present invention such as in the case of a vehicle with a very high centre of gravity or with very soft springs. This arrangement will result in a strong torque tending to turn the beams 27 along their longitudinal axis. Such tendency can be overcome by the use of a torsion member such as member 61 shown in FIGS. 7 and 8. The embodiment shown in FIGS. 7 and 8 is a flat plate of sufficient strength to resist the tendencies of the beam 27 to rotate along their longitudinal axis, but should be torsionally flexible in order to allow necessary relative movement between the beams 27. FIG. 9 shows a variation on the embodiment shown in FIGS. 7 and 8 in that the flat plate 61 is replaced by horizontal torque rods 62 and a diagonal torque rod 63.

An important feature of this tandem suspension is that there is one set of parts which has the responsibility of locating the axles longitudinally, torsionally, and laterally and there is a second set of parts which has the responsibility of providing the desired quality of cushioning, shock absorption and freedom of articulation.

In suspensions made in accordance with the present invention there is little or no longitudinal, lateral or torsional movement permitted of the axle and wheel assemblies. This overcomes the problem encountered in prior art mechanisms where under certain situations of difficult traction such as sand or mud prior suspension systems have permitted forward movement of the wheels relative to the frame due to deflection of the springs. In starting such a vehicle on dry sand it is found that the wheels creep forward with respect to the chassis of the vehicle up to a point where spinning occurs at which point the wheel assembly jumps backward and displaces sand resulting in a digging in of the rear of the vehicle, followed by repetition of the cycle.

With reference to FIGS. 1, 2 and 3, it may be seen that in this embodiment the walking beams 27 slidably rest on pads or brackets on axles 17 and 18.

The embodiments of the invention in which an exclusive property or privilege is claimed are defined as follows:

1. A tandem axle suspension system for load carrying vehicles including a load carrying chassis, tandem axles positioned transversely across said chassis and adapted to engage wheels at the outer ends thereof, said chassis comprising a substantially rectangular frame having a rigid supporting frame member fixedly attached at one end to each of the longitudinal sides thereof, the other end of each of said supporting frame members extending below the longitudinal sides of said rectangular frame and positioned intermediate said axles, each of said axles provided with a rigid upward extension, each of said rigid upward extensions having respective upper torque rod means flexibly connected thereto, said respective upper torque rod means being flexibly joined at one end thereof to said respective rigid upward extension and being flexibly joined at the other end thereof to said chassis intermediate said axles, lower torque rod means flexibly connected between each of said axles and said other end of said supporting frame, said lower torque rod means being essentially below the level of said rectangular frame and said axles, said upper and lower torque rods resisting transverse, longitudinal and torsional loads imposed upon said axles, equalizing beam means extending longitudinally on each side of said chassis, each of said equalizing beams being retainingly supported at its ends by said axles, being spacedly removed from said lower torque rods, and floating with respect to said chassis, spring means interposed between said chassis and said equalizing beams, said spring means being axially compressible and capable of flexure to permit said beams to tilt and follow the vertical movements of said axles.

2. The tandem axle suspension of claim 1 wherein said chassis includes an upper cross-member extending transversely between said longitudinal sides thereof and positioned midway between said axles, each of said upper torque rod means comprises V-shaped torque rod assembly, the apex of each said V-shaped assembly being pivotally connected to said respective rigid upward extension and the open ends of each said assembly being flexibly connected to said upper cross-member, said rigid supporting frames being connected at said other end by a lower cross-member vertically aligned below said upper cross-member and said lower torque rods being flexibly connected to the lower outer portions of said axles and said lower cross-member.

3. The tandem axle suspension of claim 1 wherein said chassis includes an upper cross-member extending transversely between said longitudinal sides thereof and positioned midway between said axles, said rigid upward extension on said axles comprises bracket means, each of said upper torque rod means comprises a torque rod flexibly connected at one end thereof to said respective bracket and at the other end thereof to said upper cross-member, said rigid supporting frames being connected at said other end by a lower cross-member vertically aligned below said upper cross-member, said lower torque rods being flexibly connected to the outer portions of said axles and said lower cross-member and a diagonal rod extending between and connected to each of said axles and said lower cross-member.

4. The tandem axle suspension of claim 1 wherein said chassis includes an upper cross-member extending transversely between longitudinal sides thereof and positioned midway between said axles, said rigid upward extension on said axles comprises a post member, each of said upper torque rod means comprises angularly disposed torque rods, each of said angularly disposed torque rods at one end thereof flexibly connected to said respective post member and at the other end thereof to said upper cross-member, said rigid supporting frames being connected at said other end by a lower cross-member vertically aligned below said upper cross-member, said lower torque rods being flexibly connected to the outer portions of said axles and said lower cross-member.

5. A tandem axle suspension as set forth in claim 1, in which said spring means comprise hollow rubber springs having the characteristics of variable spring rate and being self-damping.

6. A tandem axle suspension as in claim 1 in which the spring means are located outboard with respect to the equalizing beam means, the resulting torsional stress on said beams being counteracted by means of a holding member joined to both beams centrally thereof and adapted to resist vertical bending moment but permitting some torsional movement within its own length.

References Cited by the Examiner

UNITED STATES PATENTS

| | | | |
|---|---|---|---|
| 2,579,556 | 12/1951 | Drong | 280—104.5 |
| 2,689,136 | 9/1954 | Hendrickson | 280—104.5 |
| 2,951,709 | 9/1960 | Ward | 280—104.5 |
| 3,129,953 | 4/1964 | Hickman | 280—104.5 |

FOREIGN PATENTS

| | | |
|---|---|---|
| 758,643 | 10/1956 | Great Britain. |
| 320,274 | 8/1934 | Italy. |

BENJAMIN HERSH, *Primary Examiner.*

P. GOODMAN, *Assistant Examiner.*